United States Patent [19]

Hsieh et al.

[11] 4,446,036

[45] May 1, 1984

[54] PROCESS FOR ENHANCED OIL RECOVERY EMPLOYING PETROLEUM SULFONATE BLENDS

[75] Inventors: Wen-Ching Hsieh, Chino Hills; June M. Bostich, Brea; Jeffery W. Koepke, La Habra, all of Calif.

[73] Assignee: Union Oil Company of California, Brea, Calif.

[21] Appl. No.: 386,665

[22] Filed: Jun. 9, 1982

[51] Int. Cl.$^3$ .................. C09K 7/02; E21B 43/16
[52] U.S. Cl. ................. 252/8.55 D; 166/273; 166/274; 166/275
[58] Field of Search ................... 752/8.55 D; 166/273–275

[56] References Cited

U.S. PATENT DOCUMENTS

| | | | |
|---|---|---|---|
| 3,506,071 | 4/1970 | Jones | 166/273 |
| 3,734,185 | 5/1973 | Jones | 166/273 |
| 3,861,466 | 1/1975 | Gale | 252/8.55 D |
| 3,874,454 | 4/1975 | Clark et al. | 252/8.55 D |
| 3,901,377 | 8/1975 | Plummer et al. | 166/274 |
| 3,913,674 | 10/1975 | Krehbiel et al. | 166/270 |
| 3,964,548 | 6/1976 | Schroeder, Jr. et al. | 166/273 |
| 4,013,125 | 3/1977 | Plummer et al. | 166/273 |
| 4,177,207 | 12/1979 | Nussbaum et al. | 252/8.55 D |
| 4,252,192 | 2/1981 | Nusbaum et al. | 166/274 |
| 4,309,306 | 1/1982 | Blair, Jr. | 252/8.55 D |

*Primary Examiner*—Christine M. Nucker
*Attorney, Agent, or Firm*—Dean Sandford; Gregory F. Wirzbicki; Cleveland R. Williams

[57] ABSTRACT

Enhanced oil recovery from a subterranean petroleum reservoir is realized by successively flooding oil-bearing subterranean formations with (1) a micellar displacement fluid comprising a hydrocarbon, cosurfactant, brine and two or more different petroleum sulfonates, (2) a mobility buffer, and (3) an aqueous drive fluid; the oil is recovered from one or more production wells spaced apart from the injection well in the reservoir.

46 Claims, No Drawings

PROCESS FOR ENHANCED OIL RECOVERY EMPLOYING PETROLEUM SULFONATE BLENDS

BACKGROUND OF THE INVENTION

1. Field of the Invention

The present invention relates to the recovery of oil from subterranean petroleum reservoirs, and more particularly, to an improved micellar solution flooding process for the recovery of petroleum from subterranean reservoirs.

2. The Prior Art

It is well recognized in the petroleum industry that substantial amounts of oil remain unrecovered in a petroleum reservoir at the completion of normal primary recovery operations. Thus, various secondary methods of recovering additional quantities of oil have been proposed such as water flooding, wherein water is injected into a petroleum reservoir through an injection well to drive additional oil toward one or more production wells.

More recently microemulsions or micellar solutions of surfactants and the like have been employed in enhanced oil recovery systems. For example, U.S. Pat. No. 4,252,192 to Nussbaum et.al., relates to an enhanced oil recovery process which comprises injecting into a petroleum containing formation a micellar solution consisting of a hydrocarbon, water and a petroleum sulfonate and displacing said micellar solution through the petroleum containing formation to a production well.

U.S. Pat. No. 3,901,317 to Plummer et. al., discloses an oil recovery process which comprises flooding oil bearing subterranean formations with a micellar dispersion containing two different petroleum sulfonates having an average equivalent weight within the range of about 390 to 450. The micellar dispersion is followed by a mobility buffer slug, such as, a high molecular weight polyacrylamide and a water drive to displace the aqueous sulfonate mixture toward a production well.

U.S. Pat. No. 4,013,125 to Plummer et. al., relates to a process for flooding a subterranean formation with micellar dispersions containing petroleum sulfonates obtained by sulfonating whole or topped crude oil. The micellar dispersion contains water, a hydrocarbon, cosurfactant, electrolyte and petroleum sulfonate. Hydrocarbon is recovered from a subterranean formation by successively injecting the micellar dispersion, a mobility buffer and a water drive into said subterranean formation toward production means to recover hydrocarbon.

U.S. Pat. No. 3,913,674 to Krehbiel et. al., relates to an anionic water flood additive and method of using the same to recover hydrocarbons from a petroliferous formation. The anionic water flood additive is an overbased sulfonate derived from catalytically or thermally cracked distillate refinery streams. The water flood additive is displaced through the formation to a petroleum production well.

U.S. Pat. No. 3,964,548 to Schroeder et. al., discloses a process for recovering hydrocarbon from a subterranean formation using a micellar dispersion comprised of water, hydrocarbon, cosurfactant, electrolyte and petroleum sulfonate obtained by sulfonating whole or topped crude oil. The micellar dispersion is injected into a subterranean formation containing hydrocarbons and displaced toward oil production means.

As can readily be determined from the above, there is an ongoing effort to recover oil in enhanced oil recovery processes using micellar dispersions containing petroleum sulfonates.

Accordingly, it is an object of the present invention to provide an improved process for recovering oil from a petroleum reservoir.

Another object of this invention is to provide an improved micellar dispersion fluid for use in an enhanced oil recovery process.

Still another object of the invention is to provide a micellar solution flooding process for recovering increased amounts of oil from subterranean petroleum reservoirs.

Other objects and advantages of the invention will be apparent from the following description.

SUMMARY OF THE INVENTION

The present invention resides in an improved method for recovering petroleum from a subterranean reservoir in which a micellar solution is injected into the reservoir through an injection well in communication therewith, and thereafter a mobility buffer and aqueous flooding medium are injected to drive the micellar solution towards one or more spaced production wells from which oil is recovered. The improvement comprises injecting into said reservoir a micellar solution comprising a liquid hydrocarbon, a brine, a $C_3$ to $C_8$ monohydric alcohol or a glycol ether and a petroleum sulfonate blend produced by separately sulfonating and then neutralizing two or more different hydrocarbon fractions boiling above 700° F. by contact with a sulfonating agent and neutralizing agent under reaction conditions.

In one embodiment of the invention, the sulfonated hydrocarbon fractions are separately reacted with a neutralizing agent so as to produce hydrocarbon sulfonates in each of the fractions reacted. The hydrocarbon sulfonates are then blended to produce a hydrocarbon sulfonate blend. Alternatively, the petroleum sulfonate blend may be produced by separately sulfonating two or more different hydrocarbon fractions boiling above 700° F. by contact with a sulfonating agent under reaction conditions. The sulfonated hydrocarbon fractions are blended together to form a sulfonated hydrocarbon blend and the sulfonated hydrocarbon blend is neutralized by contact with a neutralizing agent under reaction conditions.

DETAILED DESCRIPTION OF THE INVENTION

This invention resides in an enhanced petroleum recovery process for use in petroleum reservoirs in which oil is displaced from a subterranean oil-bearing reservoir by a micellar solution. In the practice of the invention, a small imicellar solution is injected into the reservoir through one or more injection or input wells penetrating the oil-bearing formation followed by the injection of a mobility buffer slug. These fluids are driven through the reservoir by a subsequently injected aqueous drive medium which displaces them toward at least one production or output well spaced apart from the injection well, whereby oil is recovered by a conventional method. The injection and production wells may be arranged in conventional patterns designed to achieve maximum contact of the oil-bearing zones by the advancing micellar solution, mobility buffer slug and aqueous drive medium. One convenient pattern is the "five-spot" pattern wherein a central producing well is surrounded by four somewhat symetrically located injection wells. Another conventional flooding pattern is the "line-drive" pattern in which the injection wells are arranged in a line so that the injected micellar solution, mobility buffer slug and aqueous drive medium advance through the formation to displace oil toward one or more spaced production wells that may be arranged in a line substantially parallel to the line of injection wells.

Micellar solutions suitable for use herein comprise a liquid hydrocarbon, a cosurfactant selected from either a glycol ether or a $C_3$ to $C_8$ monohydric alcohol, a brine solution and a petroleum sulfonate surfactant having a broad range of equivalent weights.

Suitable liquid hydrocarbon components of the micellar solution herein include crude petroleum, especially crude petroleum having an API gravity between about 27° and 50°; distillate petroleum fractions such as refined or semirefined petroleum products such as gasoline, naphtha, stove oil, and diesel and gas oil; residual products obtained by the distillation of lower boiling fractions from a crude petroleum, for example, bunker fuel oil and other residual products; low value refinery by-products, such as catalytic cycle oil, lube oil extracts, etc., shale oil and normal, aliphatic paraffins having from 5 to 16 carbon atoms. The preferred hydrocarbon herein is a $C_5$ to $C_{16}$ paraffin for example, hexane, heptane, octane, nonane, decane, undecane, dodecane, tridecane, tetradecane, pentadecane and hexadecane and mixtures thereof.

Generally, a cosurfactant is included in the micellar solution to aid in solubilizing petroleum sulfonates and in obtaining the optimum salinity of the micellar solution. At the optimum salinity of the micellar solution, the least amount of surfactant (petroleum sulfonate) is required to bring equal amounts of oil (liquid hydrocarbon) and brine into a single phase solution. Suitable cosurfactants include the glycol ethers and $C_3$ to $C_8$ monohydric alcohols. Preferred glycol ethers are selected from ethylene glycol monoethyl ether, ethylene glycol monobutyl ether, diethylene glycol monobutyl ether, diethylene glycol monoethyl ether, diethylene glycol hexyl ether or ethylene glycol hexyl ether or a mixture thereof. Exemplary monohydric alcohols include propyl alcohol, isopropyl alcohol, butyl alcohol, isobutyl alcohol, and amyl alcohol and mixtures thereof. The glycol ethers are the preferred cosurfactant, especially ethylene glycol monobutyl ether.

Oil-field brines, containing a variety of mono- and multivalent salts, are compatible with properly compounded micellar solutions which contain mixtures of soluble oil, brine, a cosurfactant and hydrocarbon sulfonates. They are compatible because the interfacial tension between soluble oil and the brine is less than 0.5 dyne/cm. This low interfacial tension causes the reservoir brine to be displaced ahead of or along with the soluble oil. The brines, in such instances, do not cause precipitation of surfactant nor do they extract appreciable surfactant from the soluble oil. The oil in the micellar solution keeps the surfactants in solution, and adsorption of surfactants on reservoir rock surfaces is minimal.

The use of fresh water in the micellar solution is not desirable because clay-like materials in a petroleum reservoir swell and impede the displacement of said micellar solution through the reservoir. Thus, a brine solution is used to solubilize the various components in the micellar solution, preferably, a brine which approximates the brine located in the reservoir. The brine constitutes in excess of 85 weight percent of the total injected composition and is made up of water and inorganic, water-soluble salts. Suitable inorganic salts in a brine include sodium sulfate, sodium nitrate, sodium chloride, sodium tripolyphosphate ($Na_5P_3O_{10}$), sodium carbonate, etc., but the monovalent metallic salts, particularly sodium chloride, are preferred. Preferably, inorganic salts are present in the water in an amount within the range of 250 to 100,000, more preferably 500 to 40,000 most preferably 5,000 to 25,000 parts per million total dissolved solids. Other electrolytes which may be present in combination with the sodium chloride include potassium chloride, calcium chloride, magnesium chloride, sodium sulfate, ammonium chloride, and the like.

The hydrocarbon sulfonates suitable for use in the micellar solutions herein are derived from either natural or synthetic liquid hydrocarbon feedstock. Natural liquid hydrocarbons suitable for use herein as feedstock include such diverse materials as petroleum distillates and residues, crude petroleum, shale oil, shale oil distillates, gas oil, residual oil, tar-sand oil, and mixtures thereof.

Preferred crude oils are those having molecular weights in the range of from about 200 to about 1,000, preferably from about 300 to about 800, especially from about 350 to about 500. The percent aromatics and olefins in the crude oil composition may vary from 10 to about 95, preferably from about 20 to about 80, most preferably from about 25 to about 50 weight percent. However, since the aromatic compounds in the crude oil are the primary compounds which undergo sulfonation, it is desirable to have a high aromatic content in the crude oil, preferably above 10 weight percent.

The hydrocarbon sulfonates are produced by separately sulfonating two or more different hydrocarbon fractions boiling above 700° F. by contacting the individual fractions with a sulfonating agent under reaction conditions. Next, the sulfonated fractions are separately neutralized by contact with a neutralizing agent so as to produce hydrocarbon sulfonates in each of the fractions reacted. Alternatively, two or more different hydrocarbon fractions boiling above 700° F. may be individually contacted with a sulfonating agent under reaction conditions, blended to provide a sulfonated hydrocarbon blend and neutralized to produce a hydrocarbon sulfonate blend.

In a preferred embodiment of the invention, a lube crude oil is first distilled or "topped" in a standard atmospheric distillation unit within a boiling range of from about 75° F. to about 650° F. to produce a reduced topped crude oil. Next, the topped lube oil is distilled in a standard high vacuum distillation unit under a vacuum of from about 1 to about 7 p.s.i.a., preferably from about 1.5 to about 3 p.s.i.a. Vacuum gas oil is the lightest material, having a boiling point within the range of from about 540° F. to about 610° F. The light vacuum gas oil is not utilized as a source for petroleum sulfonates herein because the equivalent weight of the compounds derived from said vacuum gas oil is too low to be effective in certain enhanced petroleum recovery systems. Normally, the distilled vacuum gas oil is sent to a fluid catalyst cracking (FCC) unit for further processing.

A first petroleum fraction is vacuum distilled from the lube oil at a temperature of from about 540° F. to about 890° F. with at least 50 percent by volume of the fraction boiling within the range of from about 720° F. to about 820° F. The fraction has a typical viscosity range of from about 20 to about 40 centistokes at 100° F. This petroleum fraction is the source feed for low equivalent weight petroleum sulfonates which preferably have average equivalent weights within the range of from about 300 g/eq to about 400 g/eq.

A second petroleum fraction is vacuum distilled from the lube oil at a temperature within the range of from about 670° F. to about 1,000° F. with at least 50 percent by volume of the fraction boiling within the range of from about 770° F. to about 890° F. This petroleum fraction has a viscosity of from about 95 to about 100 centistokes at 100° F. and, in addition, is the source feed for medium equivalent weight petroleum sulfonates which have equivalent weights within the range of from about 350 g/eq to about 450 g/eq.

A third petroleum fraction produced in the vacuum distillation unit is vacuum distilled from the lube oil at a temperature of from about 710° F. to about 1,090° with at least 50 percent by volume of the fraction boiling within the range of from about 940° F. to about 980° F. The fraction has a typical viscosity within the range of from about 125 to about 350 centistokes at 100° F. This petroleum fraction is the source feed for high equivalent weight petroleum sulfonates which have average equivalent weights within the range of from 400 g/eq to about 500 g/eq.

A fourth petroleum fraction comprises the vacuum resid from the above vacuum distillation which is sent to a standard propane deasphalting unit. This petroleum fraction is vacuum distilled from the lube oil with at least 30 percent by volume of the fraction boiling within the range of 1,000° F. to 1,120° F. It should be noted that some of the vacuum resid will not boil in this temperature range; however, the entire resid is sent to a standard deasphalting unit. In the deasphalting unit, the vacuum resid is contacted with liquid propane at a weight ratio of from about 1:5 to about 1:10 respectively, at a temperature of from about 100° F. to about 200° F., and a pressure of from about 200 p.s.i.g. to about 400 p.s.i.g. The deasphalted petroleum fraction is the source feed for very high equivalent weight petroleum sulfonates which have average equivalent weights within the range of from about 500 g/eq to about 700 g/eq. A typical viscosity for this petroleum fraction is within the range of from about 30 to about 50 centistokes at 210° F.

It should be noted that there is some overlap in the distillation temperature and molecular weights of the various petroleum fractions because each fraction is a mixture of compounds having different boiling point ranges and the molecular weights reported represent an average of molecular weights of the compounds in the particular petroleum fraction. In addition, a minimum of two or more different petroleum fractions is required to produce the petroleum sulfonate blends suitable for use in the process herein.

Sulfonation of the two or more different petroleum fractions is performed using standard equipment and techniques. The term sulfonation as used herein designates any procedure by which a sulfonic acid group ($-SO_2OH$) or corresponding salt or sulfonyl halide is attached to a carbon atom. Sulfonates are classified according to the group to which the $-SO_2$ is attached. Sulfonating agents which are suitable for use herein include sulfur trioxide and fuming sulfuric acid, the latter of which comprises sulfur trioxide dissolved in sulfuric acid. Sulfonation is generally carried out directly by contacting the petroleum fractions with a sulfonating agent under reaction conditions. Since the sulfonation reaction herein is extremely rapid, it is desirable to first dilute the petroleum fraction with a $C_1$ to $C_6$ halogenated hydrocarbon which acts as a viscosity control agent, and thermal diluent for the reaction, and, in addition, reduces side reactions in the sulfonation process. Preferred $C_1$ to $C_6$ halogenated hydrocarbons are selected from methylene chloride, ethylene chloride, ethyl chloride, n-propyl chloride, isopropyl chloride, n-butyl chloride, isobutyl chloride, hexyl fluoride or a mixture thereof. Preferably, the petroleum fraction and $C_1$ to $C_6$ halogenated hydrocarbon are admixed in a weight ratio range of from about 1:0 to about 1:10, especially from about 1:0.1 to about 1:3. The diluted petroleum fraction is contacted with the sulfonating agent at a concentration sufficient to monosulfonate the aromatic compounds in the petroleum fraction. The amount of sulfonating agent used will depend upon the aromatic content of the petroleum fraction, since the aromatic compound is the primary compound which undergoes sulfonation in the reaction. Thus, the sulfur to aromatic compound ratio is important in determining the degree of sulfonation in the reaction. Preferably, the amount of sulfonating agent used in the reaction comprises from about 0.02 to about 1.5 grams of sulfonating agent per gram of petroleum fraction(s) used in the reaction. When sulfur trioxide is used as the sulfonating agent, the sulfur trioxide is heated to a temperature of from about 0° to about 400° F., preferably from about 100° F. to about 180° F. to facilitate formation of gaseous sulfur trioxide. Next, an inert carrier gas, for example, nitrogen or air is utilized to sweep the gaseous sulfur trioxide into contact with the petroleum fraction.

Reaction conditions include temperatures within the range of from about 80° F. to about 400° F.; however, reaction temperatures greater than 250° F. may result in undesirable charred products. The preferred reaction pressure is atmospheric pressure, but pressures up to 150 p.s.i.g. may be used without deleterious effect upon the sulfonation reaction. It should be noted that standard techniques and apparatus are used in the sulfonation reaction.

Generally, the sulfonating step comprises separately sulfonating two or more different hydrocarbon oil fractions boiling above 700° F. by contact with a sulfonating agent so as to substantially monosulfonate each hydrocarbon oil fraction. It should be noted that each hydrocarbon oil fraction contains a different distribution of aromatic compounds; thus the amount and rate of contact of sulfonating agent used in the reaction will vary in accordance with the aromatic content of the hydrocarbon fraction undergoing sulfonation.

Next, the two or more different hydrocarbon fractions are separately neutralized to produce at least a first fraction having an average molecular weight below 500 with at least 80 percent of the sulfonates being monosulfonates and at least a second fraction having an average molecular weight above 500 with at least 25 percent of the sulfonates being monosulfonates.

Neutralizing agents used usually comprise an aqueous basic solution containing a monovalent or divalent cation. Suitable neutralizing agents include aqueous solutions of sodium hydroxide, ammonium hydroxide, lithium hydroxide, potassium hydroxide, sodium carbonate, lithium carbonate, magnesium hydroxide, ammonium carbonate or magnesium carbonate, or mixtures thereof. The preferred neutralizing agents are sodium hydroxide or ammonium hydroxide. The pH of the reaction mixture during the neutralization reaction is maintained at about 3 to about 14, preferably from about 10 to about 13 and at a temperature below 175° F., preferably from about 20° F. to about 175° F.

After neutralization of the petroleum sulfonic acids, a petroleum sulfonate is produced which may be recovered by extraction with a mixture of a $C_3$ to $C_{10}$ aliphatic hydrocarbon and an aqueous solution of a $C_1$ to $C_5$ alcohol or a polar solvent, the extraction usually being performed with a weight ratio of petroleum sulfonate to $C_3$ to $C_{10}$ aliphatic hydrocarbon to $C_1$ to $C_5$ alcohol or polar solvent between about 1:0:0.1 and about 1:20:1,000, preferably between 1:0:0.5 and about 1:10:100. Desirable $C_3$ to $C_{10}$ aliphatic hydrocarbons include pentane, hexane, heptane, octane, nonane or decane or a mixture thereof. Pentane is the preferred aliphatic hydrocarbon. The $C_1$ to $C_5$ alcohol or polar solvent is usually selected from methanol, ethanol, propanol, isopropanol, bezene, or toluene, or a mixture thereof. The preferred alcohol is isopropanol.

By separately sulfonating, and then neutralizing and extracting the various petroleum fractions, low, medium, high and very high equivalent weight petroleum sulfonates are produced which may be blended together to provide a surfactant slug useful in an enhanced petroleum recovery process.

In some petroleum sulfonate preparations, it is desirable to blend the petroleum sulfonates without utilizing an extraction step in the process. Thus, the petroleum fractions may be sulfonated, neutralized and blended into the desired composition. Generally, the petroleum sulfonate fractions are admixed at a ratio range of from about 1:1:1:1 to about 5:10:10:5.

These petroleum fractions are suitable for use in enhanced petroleum recovery systems. The typical enhanced petroleum recovery system is based upon the use of a surfactant slug of soluble oil which contains a broad range of equivalent weight sulfonates. The equivalent weight range of the petroleum sulfonates is from about 300 g/eq. to about 700 g/eq., but the optimal distribution or character is not precisely known and even varies according to the characteristics and properties of the oil reservoir selected to undergo an enhanced petroleum recovery process. It is known that high equivalent weight sulfonates are required for low interfacial tension and that low equivalent weight sulfonates are required for water and oil-water solubility in an enhanced petroleum recovery process. Sufonates having equivalent weights lower than 300 are generally undesirable because of their extreme water solubility. They tend to move ahead of the soluble oil slug front with the flowing water phase. Petroleum sulfonates having too high equivalent weights, i.e., above 700 g/eq., are generally too oil soluble and tend to be retained in the rock behind the oil slug.

The precise blend of petroleum sulfonates to be used in the micellar solution used in the enhanced petroleum recovery process of the invention is usually determined by first determining the optimal salinity of the petroleum sulfonate in a brine containing monovalent ions or salts, usually sodium chloride, sodium carbonate, etc. Generally, the brine solution used to determine optimal salinity of the petroleum sulfonate blend approximates in composition the brine located in the reservoir to undergo an enhanced oil recovery process. The optimal salinity is determined by mixing determined concentrations of a hydrocarbon, petroleum sulfonate, cosurfactant and brine, said brine usually containing a determined concentration of salt, until the hydrocarbon phase and aqueous phase are in equilibrium. In addition, core samples from strategic locations within the reservoir are taken to determine pore volume, reservoir composition, type cations located in the reservoir, etc. At optimal salinity, it takes the least amount of petroleum sulfonate blend to bring equal amounts of oil and brine into solution in a micellar solution. After all of the data generated from the collected samples are analyzed, a core flooding test is performed to determine the effectiveness of a petroleum sulfonate blend in recovering oil from a representative core.

Normally, the micellar solution comprises from about 10 to about 90 volume percent, preferably from about 10 to about 35 volume percent of a hydrocarbon, from about 4 to about 30 volume percent, especially from about 8 to about 15 volume percent of a petroleum sulfonate blend, from 0.5 to about 80 volume percent, especially from about 4 to about 15 volume percent of a glycol ether or a $C_3$ to $C_8$ monohydric alcohol, from about 10 to about 90 volume percent, preferably from about 50 to about 80 volume percent of a brine which comprises an aqueous solution of a water-soluble salt containing from about 0.01 to about 10 weight percent, preferably from about 0.01 to about 3 weight percent of said salt.

The micellar solution is injected into the petroleum reservoir in an amount sufficient to establish in the reservoir an oil displacement bank. Typically, this amount of micellar solution will range between 0.01 to about 0.30 pore volume, preferably from about 0.01 to about 0.15 pore volume of the reservoir formation.

Suitable buffer mobility solutions comprise a brine solution containing from about 50 to about 6,000 ppm, preferably from about 50 to about 4,000 ppm of a polymeric compound having a molecular weight within the range of from about 1,000,000 to about 30,000,000. Polymeric compounds which are useful herein include polyacrylamide, polyethylene oxide, and polysaccaride, and hydroxyethyl cellulose.

The buffer mobility solution and aqueous drive medium are injected into the reservoir after the micellar solution injection step. The mobility buffer is injected into the reservoir in an amount within the range of from about 0.001 to about 1.0 pore volume, preferably from about 0.01 to about 0.25 pore volume of the reservoir formation. The aqueous drive medium is simply injected until all feasible recovery of oil has been made.

The invention is further illustrated by the following examples which are illustrative of various aspects of the invention and are not intended as limiting the scope of the invention as defined by the appended claims.

EXAMPLE I

A micellar solution is prepared in accordance with the procedure of this invention by blending a petroleum sulfonate composition having a broad distribution of equivalent weights as summarized in Table 1 below:

TABLE 1

| Sulfonate | Grams | Wt % | Avg.[1] EW | Sulfonate[2] Activity |
|---|---|---|---|---|
| Low EW |  | 16.7 | 370 | 81.5 |
| Medium EW |  | 33.3 | 465 | 60.8 |
| High EW |  | 33.3 | 471 | 84.1 |

TABLE 1-continued

| Sulfonate | Grams | Wt % | Avg.[1] EW | Sulfonate[2] Activity |
|---|---|---|---|---|
| Very High EW | 16.7 | | 555 | 72.6 |

Average equivalent weight of the blended petroleum sulfonates - 449.3
[1]EW = equivalent weight, measured.
[2]Sulfonate Activity is defined herein as the sulfonate content of the sample.

A micellar solution is prepared by admixing 6 grams of the petroleum sulfonate blend of Table 1, with 5 ml of ethylene glycol mono butyl ether, 18.5 ml of octane and 25 ml of an aqueous brine solution containing 1.8 weight percent sodium chloride.

EXAMPLES II to IV

The following laboratory scale sand flooding tests are conducted to demonstrate the improvement in oil recovery utilizing a broad equivalent weight petroleum sulfonate micellar displacement system. This petroleum sulfonate is compared with two commercially available petroleum sulfonates.

The sandpack floods are conducted using 2-foot long lucite cores having an inside diameter of 1½ inches, packed with #16 silica sand. The packed cores are prepared by evacuation for 1 hour at 29 p.s.i.g. vacuum with a Precision Model D vacuum pump, manufactured by GCA Corporation, Precision Scientific Group, Chicago, Il!. Each core is first saturated with a brine containing 10 weight percent sodium chloride. Next, the core is flooded with octane by continually passing octane through the core overnight. After an irreducible water saturation is achieved, the core is flooded with a brine containing 10 weight percent sodium chloride to residual oil saturation.

The oil recovery operation is conducted by injecting the below described amount of micellar solution into the core followed by injection of 1 pore volume of a mobility buffer solution comprising 0.63 grams of polyacrylamide (Cort 325, marketed by Custom Oil Recovery Technology) admixed with 250 ml of brine containing 0.2 weight percent of sodium chloride. Next, a brine containing 0.2 weight percent of sodium chloride is injected into the core (1.5 pore volume) until octane is no longer recovered from the core.

In Example II, the micellar solution is formed by admixture of the following components:

TABLE II

| Component | Micellar Solution Weight % |
|---|---|
| Petroleum sulfonate of Example I | 13.5 |
| Ethylene Glycol Mono Butyl Ether | 1.0 |
| Octane | 29.2 |
| Brine (1.8% NaCl) | 56.3 |

The sand pack core is injected with 6 ml of the above micellar solution.

In Example III, the micellar solution is formed by admixture of the following components:

TABLE III

| Component | Micellar Solution Weight % |
|---|---|
| Exxon PDM 337[1] | 13.5 |
| Ethylene Glycol Mono Butyl Ether | 1.0 |
| Octane | 29.2 |
| Brine (1.8% NaCl) | 56.3 |

[1]Exxon PDM 337 - A petroleum sulfonate composition marketed commercially by the Exxon Corporation and having the following equivalent weight distribution:

TABLE IV

| EW | Weight % |
|---|---|
| 335 | 3.3 |
| 349 | 6.3 |
| 363 | 15.9 |
| 377 | 62.8 |
| 391 | 5.2 |
| 405 | 2.6 |
| 419 | 2.3 |
| 433 | 1.6 |

[1]Average Equivalent Weight = 375, measured.
[2]Average sulfonate activity = 80 percent.
[3]Equivalent Weight is calculated as sodium salt.

The sandpack core is injected with 7 ml of the above micellar solution.

In Example IV, the micellar solution is comprised of the following components:

TABLE V

| Component | Micellar Solution Weight % |
|---|---|
| Stepan, Petrostep[1] sulfonate | 24.0 |
| Ethylene Glycol Mono butyl ether | 1.0 |
| Octane | 20.5 |
| Brine (1.6% NaCl) | 54.5 |

[1]Stepan, Petrostep sulfonate, a commercially available petroleum sulfonate marketed by the Stepan Company and having the following equivalent weight distribution:

TABLE VI

| Equivalent Weight | Weight % |
|---|---|
| 207 | 32.90 |
| 318 | 1.58 |
| 478 | 42.3 |
| 510 | 7.54 |
| 522 | 1.78 |
| 535 | 3.17 |
| 552 | 2.88 |
| 568 | 7.83 |

[1]Average Equivalent Weight = 450 measured.
[2]Average sulfonate activity = 47%.

The sandpack core is injected with 6.5 ml of the above micellar solution.

A Constametric Model III pump, manufactured by Laboratory Data Control, Division of Melton Ray Company is used for preliminary oil and water floods of the sandpack. During the flooding procedure, the sandpack is rotated continuously to prevent gravity segregation and is maintained at a temperature of 110° F. by a YST Model 72 Proportional Temperature Controller, manufactured by The Scientific Division of Fellow Springs Instrument Company.

The micellar solution and mobility buffer are preheated to 110° F. on a thermostatically controlled Cole-Parmer Model 4812 stirrer-hot plate to ensure that the surfactant would be in single phase upon injection in the sandpack. An ISCO Model 314 Metering Pump is used to inject the micellar solution (0.025 pore volume), 1 pore volume of mobility buffer solution and 1.5 pore volume of brine containing 0.2 weight percent of sodium chloride into the sandpack core at the rate of 1 ft/day.

Effluents from the sandpack core are collected in open 15 ml centrifuge tubes using an Eldex Universal Fraction Collector. The volumes of oil, water and microemulsion phases are recorded. The results are summarized in Table VI below:

TABLE VI

| Example | Micellar Solution | % Oil Recovered | % Petroleum Sulfonate Recovered | Waterflood Residual Oil % Pore Volume | Final Residual Oil % Pore Volume |
|---|---|---|---|---|---|
| II | Ex II | 96.6 | 78.2 | 19.8 | 0.7 |
| III | Ex III (Exxon PDM 337) | 75.2 | 95.2 | 16.9 | 4.2 |
| IV | Ex IV (Stepan Petrostep Sulfonate) | 77.0 | 29.3 | 17.7 | 4.1 |

The above Table summarizes the pore volume, residual oil saturation, oil recovery, and surfactant production for petroleum sulfonates produced in accordance with the procedure herein, Exxon and Stepan sulfonates.

EXAMPLES V to VII

The producure utilized in the laboratory scale flooding tests of Examples II to IV are used to demonstrate the improvement in oil recovery using the micellar solutions therein with the following exception:

0.5 weight percent of calcium as anhydrous $CaSO_4$ is mixed into the #16 silica sand prior to packing the lucite core. The results are summarized in Table VII below:

TABLE VII

| Example | Micellar Solution | % Oil Recovered | % Petroleum Sulfonate Recovered | Waterflood Residual Oil % Pore Volume | Final Residual Oil % Pore Volume |
|---|---|---|---|---|---|
| V | Ex II | 70.7 | 11.4 | 16.2 | 4.7 |
| VI | Ex III (Exxon PDM 337) | 45.3 | 0 | 18.0 | 9.8 |
| VII | Ex IV (Stepan petrostep sulfonate) | 49.1 | 4.9 | 17.7 | 9.0 |

The above Table summarizes the pore volume, residual oil saturation, and oil recovery using petroleum sulfonates produced in accordance with the procedure herein, Exxon and Stepan sulfonates, when calcium is added to the sandpack prior to micellar flooding.

The data summarized in Tables VI and VII demonstrate the superior oil recovery properties of the blended petroleum sulfonates herein when compared with two commercially availpetroleum sulfonates, i.e. Exxon PDM 337 and Stepan Petrostep sulfonate.

Obviously many modifications and variations of the invention, as hereinbefore set forth, may be made without departing from the spirit and scope thereof, and only such limitations should be imposed as are indicated in the appended claims.

We claim:

1. In a method for recovering petroleum from a subterranean reservoir including the steps of injecting into said reservoir through an injection well a micellar displacement fluid comprising a micellar solution, a mobility buffer, and thereafter injecting an aqueous flooding medium to drive said micellar displacement system towards a spaced production well from which fluids are recovered, the improvement which comprises injecting into the reservoir a micellar solution comprising a liquid hydrocarbon, a $C_3$ to $C_8$ monohydric alcohol or a glycol ether, a brine and a blend of hydrocarbon sulfonates produced by the steps of:
   (A) separately sulfonating two or more different hydrocarbon fractions boiling above 700° F. by contact with a sulfonating agent under reaction conditions; and
   (B) neutralizing th sulfonated fractions obtained from step (A) with a neutralizing agent so as to produce petroleum sulfonates.

2. In a method for recovering petroleum from a subterranean reservoir including the steps of injecting into said reservoir through an injection well a micellar displacement fluid comprising a micellar solution, a mobility buffer, and thereafter injecting an aqueous flooding medium to drive said micellar displacement system towards a spaced production well from which fluids are recovered, the improvement which comprises injecting into the reservoir a micellar solution comprising a liquid hydrocarbon, a $C_3$ to $C_8$ monohydric alcohol or a glycol ether, a brine and a blend of hydrocarbon sulfonates produced by the steps of:
   (A) separately sulfonating two or more different hydrocarbon fractions boiling above 700° F. by contact with a sulfonating agent under reaction conditions;
   (B) neutralizing the sulfonated fractions obtained from step (A) with a neutralizing agent so as to produce petroleum sulfonates; and
   (C) blending hydrocarbon sulfonates produced in two or more of said fractions.

3. The method defined in claim 2 wherein the liquid hydrocarbon is a member selected from the group consisting of crude petroleum, distillate petroleum fractions, shale oil, shale oil distillates and an aliphatic paraffin having from 5 to 16 carbon atoms and mixtures thereof.

4. The method defined in claim 3 wherein the liquid hydrocarbon is an aliphatic paraffin selected from the group consisting of hexane, heptane, octane, nonane, decane, undecane, dodecane, tridecane, tetradecane, pentadecane and hexadecane and mixtures thereof.

5. The method defined in claim 2 wherein the micellar solution comprises a monohydric alcohol selected from the group consisting of propyl alcohol, isopropyl alcohol, butyl alcohol, isobutyl alcohol and amyl alcohol and mixtures thereof.

6. The method defined in claim 2 wherein the micellar solution comprises a glycol ether selected from the group consisting of ethylene glycol monoethyl ether, ethylene glycol monobutyl ether, diethylene glycol monobutyl ether, diethylene glycol monoethyl ether, diethylene glycol hexyl ether and ethylene glycol hexyl ether and mixtures thereof.

7. The method defined in claim 2 wherein the brine comprises water containing from about 0.01 to about 10 weight percent of a water soluble salt.

8. The method defined in claim 7 wherein the water soluble salt is a member selected from the group consisting of sodium chloride, sodium sulfate, sodium nitrate, sodium tripolyphosphate, and sodium carbonate and mixtures thereof.

9. The method defined in claim 2 wherein hydrocarbon sulfonates blended in step (C) include those derived from a fraction in step (A) comprised of components, at least 90 percent by volume of which boil above 700° F. and 50 percent by volume boil within the range of 720° F. to 820° F.

10. The method defined in claim 2 wherein hydrocarbon sulfonates blended in step (C) include those derived from a fraction produced in step (A) comprised of components, at least 90 percent by volume of which boil above 700° F. and 50 percent by volume boil within the range of 770° F. to 890° F.

11. The method defined in claim 2 wherein hydrocarbon sulfonates blended in step (C) include those derived from a fraction produced in step (A) comprised of components, at least 90 percent by volume of which boil above about 700° F. and 50 percent by volume boil in the range of 880° to 1,000° F.

12. The method defined in claim 2 wherein hydrocarbon sulfonates blended in step (C) include those derived from a fraction produced in step (A) comprised of components, at least 90 percent by volume of which boil above about 700° F. and 30 percent by volume boil in the range of 1,000° to 1,120° F.

13. The method defined in claim 2 wherein hydrocarbon fractions of step (A) contain from about 10 to about 80 percent aromatics.

14. The method defined in claim 2 wherein the hydrocarbon sulfonate blend has an average equivalent weight within the range of from about 300 g/eg. to about 700 g/eq. with at least 50 percent of the sulfonates having an equivalent weight within the range of from about 300 g/eq. to about 450 g/eq.

15. The method defined in claim 2 wherein the micellar solution is injected into the reservoir in an amount equivalent to from about 0.01 to about 0.30 pore volume of said reservoir.

16. The method defined in claim 2 wherein the mobility buffer is injected into the reservoir in an amount equivalent to from about 0.001 to about 1.0 pore volume of said reservoir.

17. In a method for recovering petroleum from a subterranean reservoir including the steps of injecting into said reservoir through an injection well a micellar displacement fluid comprising a micellar solution and mobility buffer, and thereafter injecting an aqueous flooding medium to drive said micellar displacement system towards a spaced production well from which fluids are recovered, the improvement which comprises injecting into the reservoir a micellar solution comprising a liquid hydrocarbon, a glycol ether, a brine and a blend of hydrocarbon sulfonates prepared by:
(A) separately sulfonating two or more different hydrocarbon oil fractions boiling above 700° F. by contact with a sulfonating agent under reaction conditions,
(B) blending the sulfonated hydrocarbon fractions to produce a sulfonated hydrocarbon blend; and
(C) neutralizing the sulfonated hydrocarbon blend obtained from step (B) by reaction with a neutralizing agent so as to produce hydrocarbon sulfonates in the blended fractions.

18. The method defined in claim 17 wherein the sulfonating in step (A) and neutralizing in step (C) is such that one of the blended fractions has an average molecular weight below 500 with at least 80 percent of the sulfonates being monosulfonates.

19. The method defined in claim 17 wherein the liquid hydrocarbon is a member selected from the group consisting of crude petroleum, distillate petroleum fractions, shale oil, shale oil distillates and an aliphatic paraffin having from 5 to 16 carbon atoms and mixtures thereof.

20. The method defined in claim 17 wherein the micellar solution comprises a glycol ether selected from the group consisting of ethylene glycol monoethyl ether, ethylene glycol monobutyl ether, diethylene glycol monobutyl ether, diethylene glycol monoethyl ether, diethylene glycol hexyl ether and ethylene glycol hexyl ether and mixtures thereof.

21. The method defined in claim 17 wherein the brine comprises water containing from about 0.01 to about 10 weight percent of a water soluble salt.

22. The method defined in claim 21 wherein the water soluble salt is a member selected from the group consisting of sodium chloride, sodium sulfate, sodium nitrate, sodium tripolyphosphate, and sodium carbonate and mixtures thereof.

23. The method defined in claim 17 wherein the sulfonated hydrocarbons blended in step (B) are derived from a fraction in step (A) comprised of components, at least 90 percent by volume of which boil above 700° F. and 50 percent by volume boil within the range of 720° F. to 820° F.

24. The method defined in claim 17 wherein the sulfonated hydrocarbons blended in step (B) are derived from a fraction in step (A) comprised of components, at least 90 percent by volume of which boil above 700° F. and 50 percent by volume boil within the range of 770° F. to 890° F.

25. The method defined in claim 17 wherein the sulfonated hydrocarbons blended in step (B) are derived from a fraction in step (A) comprised of components, at least 90 percent by volume of which boil above about 700° F. and 50 percent by volume boil in the range of 880° to 1,000° F.

26. The method defined in claim 17 wherein the sulfonated hydrocarbons blended in step (B) are derived from a fraction in step (A) comprised of components, at least 90 percent by volume of which boil above about 700° F. and 30 percent by volume boil in the range of 1,000° to 1,120° F.

27. The method defined in claim 17 wherein the hydrocarbon fractions of step (A) contain from about 10 to about 80 percent aromatics.

28. The method defined in claim 17 wherein the sulfonated hydrocarbons blended in step (B) are derived from four fractions in step (A), each comprised of components at least 90 percent by volume of which boil above 700° F., with at least 50 percent by volume of the first fraction boiling within the range of 720° F. to 820° F., at least 50 percent by volume of the second fraction boiling within the range of 770° F. to 890° F., at least 50 percent by volume of the third fraction boiling within the range of 880° F. to 1,000° F., and at least 30 percent by volume of the fourth fraction boiling within the range of 1,000° F. to 1,120° F.

29. The method defined in claim 17 wherein the hydrocarbon sulfonate blend has an average equivalent weight within the range of from about 300 g/eq. to about 700 g/eq. with at least 50 percent of the sulfonates having an equivalent weight within the range of from about 300 g/eq. to about 450 g/eq.

30. The method defined in claim 17 wherein the micellar solution is injected into the reservoir in an amount equivalent to from about 0.01 to about 0.30 pore volume of said reservoir.

31. The method defined in claim 17 wherein the mobility buffer is injected into the reservoir in an amount equivalent to from about 0.001 to about 1.0 pore volume of said reservoir.

32. In a method for recovering petroleum from a subterranean reservoir including the steps of injecting into said reservoir through an injection well a micellar displacement fluid comprising a micellar solution and mobility buffer, and thereafter injecting an aqueous flooding medium to drive said micellar displacement system towards a spaced production well from which fluids are recovered, the improvement which comprises injecting into the reservoir a micellar solution comprising a liquid hydrocarbon, a glycol ether, a brine and a blend of hydrocarbon sulfonates prepared by:

(A) separately sulfonating two or more different hydrocarbon oil fractions boiling above 700° F. by contact with a sulfonating agent under reaction conditions, (B) separately neutralizing the sulfonated fractions obtained from step (A) by reaction with a neutralizing agent so as to produce hydrocarbon sulfonates in each of the fractions reacted, said sulfonating in step (A) and neutralizing in step (B) being such that one of the resultant fractions comprise a first fraction having an average molecular weight below 500 with at least 80 percent of the sulfonates being monosulfonates and a second fraction having an average molecular weight above 500 with at least 25 percent of the sulfonates being monosulfonates; and (C) blending hydrocarbon sulfonates produced in two or more of said sulfonated hydrocarbon fractions, including the first and second fractions.

33. The method defined in claim 32 wherein the liquid hydrocarbon is a member selected from the group consisting of crude petroleum, distillate petroleum fractions, shale oil, shale oil distillates, and octane and mixtures thereof.

34. The method defined in claim 32 wherein the glycol ether is a member selected from the group consisting of ethylene glycol monoethyl ether, ethylene glycol monobutyl ether, diethylene glycol monobutyl ether, diethylene glycol hexyl ether and ethylene glycol hexyl ether and mixtures thereof.

35. The method defined in claim 32 wherein the brine comprises water containing from about 0.01 to about 10 weight percent of sodium chloride.

36. The method defined in claim 32 wherein the hydrocarbon sulfonates blended in step (C) are derived from a fraction in step (A) comprised of components, at least 90 percent by volume of which boil above 700° F., and 50 percent by volume boil within the range of 720° F. to 820° F.

37. The method defined in claim 32 wherein hydrocarbon sulfonates blended in step (C) are derived from a fraction in step (A) comprised of components, at least 90 percent by volume of which boil above 700° F. and 50 percent by volume boil within the range of 770° F. to 890° F.

38. The method defined in claim 32 wherein hydrocarbon sulfonates blended in step (C) are derived from a fraction in step (A) comprised of components, at least 90 percent by volume of which boil above about 700° F. and 50 percent by volume boil in the range of 880° to 1,000° F.

39. The method defined in claim 32 wherein the hydrocarbon sulfonates blended in step (C) are derived from a fraction in step (A) comprised of components, at least 90 percent by volume of which boil above about 700° F. and 30 percent by volume boil in the range of 1,000° to 1,120° F.

40. The method defined in claim 32 wherein the hydrocarbon blend has an average equivalent weight within the range of from about 300 g/eq. to about 700 g/eq. with at least 50 percent of the sulfonates having an equivalent weight within the range of from about 300 g/eq. to about 450 g/eq.

41. The method defined in claim 32 wherein the hydrocarbon sulfonate blend has an average equivalent weight within the range of from about 300 g/eq. to about 500 g/eq. with at least 50 percent of the sulfonates having an equivalent weight within the range of from about 300 to about 450 g/eq.

42. The method defined in claim 32 wherein the hydrocarbon sulfonates blended in step (C) are derived from four hydrocarbon oil fractions produced in step (A), each comprised of components, at least 90 percent by volume of which boil above 700° F., with at least 50 percent by volume of the first fraction boiling in the range of 720° F. to 820° F., at least 50 percent by volume of the second fraction boiling within the range of 770° F. to 890° F., at least 50 percent by volume of the third fraction boiling within the range of 880° F. to 1,000° F., and at least 30 percent by volume of the fourth fraction boiling within the range of 1,000° F. to 1,120° F.

43. The method defined in claim 32 wherein the hydrocarbon oil fractions are derived from a single hydrocarbon source.

44. The method defined in claim 32 wherein the micellar solution is injected into the reservoir in an amount equivalent to from about 0.01 to about 0.30 pore volume of said reservoir.

45. The method defined in claim 32 wherein the mobility buffer is injected into the reservoir in an amount equivalent to from about 0.001 to about 1.0 pore volume of said reservoir.

46. In a method for recovering petroleum from a subterranean reservoir including the steps of injecting into said reservoir through an injection well a micellar displacement fluid comprising a micellar solution and mobility buffer, and thereafter injecting an aqueous flooding medium to drive said micellar displacement system towards a spaced production well from which fluids are recovered, the improvement which comprises injecting into the reservoir a micellar solution comprising a liquid hydrocarbon, a $C_3$ to $C_8$ monohydric alcohol or a glycol ether, a brine and a composition consisting essentially of a blend of hydrocarbon sulfonates produced by:

(A) separately sulfonating with a sulfonating agent and neutralizing with a neutralizing agent two or more different hydrocarbon fractions, each fraction containing components, at least 90 percent by volume of which boil above 700° F., said sulfonation reaction being such that the resultant fractions have either an average molecular weight at or above 500 with at least 25 percent of the sulfonates being monosulfonates or an average molecular weight below 500 with at least 80 percent of the sulfonates being monosulfonates and (B) blending at least a portion of the sulfonates produced from one of said fractions with at least a portion of the sulfonates produced from the other fraction.

* * * * *